United States Patent
Duan et al.

(10) Patent No.: US 10,857,854 B2
(45) Date of Patent: Dec. 8, 2020

(54) COOLING SYSTEM AIR FLOW DIAGNOSIS

(71) Applicant: GM Global Technology Operations LLC, Detroit, MI (US)

(72) Inventors: Shiming Duan, Ann Arbor, MI (US); Christopher H. Knieper, Chesaning, MI (US); Calvin Wang, Sterling Heights, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 71 days.

(21) Appl. No.: 16/380,518

(22) Filed: Apr. 10, 2019

(65) Prior Publication Data

US 2020/0324619 A1 Oct. 15, 2020

(51) Int. Cl.
*B60H 1/00* (2006.01)
*B60H 1/32* (2006.01)

(52) U.S. Cl.
CPC ....... *B60H 1/00978* (2013.01); *B60H 1/0073* (2019.05); *B60H 1/00807* (2013.01); *B60H 2001/00733* (2019.05); *B60H 2001/3261* (2013.01); *B60H 2001/3263* (2013.01)

(58) Field of Classification Search
CPC .............. B60H 1/00978; B60H 1/0073; B60H 1/00807; B60H 2001/00733; B60H 2001/3261; B60H 2001/3263
See application file for complete search history.

(56) References Cited

U.S. PATENT DOCUMENTS

| | | | | |
|---|---|---|---|---|
| 9,534,968 | B2* | 1/2017 | Nakano | G01K 15/007 |
| 9,696,073 | B2* | 7/2017 | Noboa | F25B 13/00 |
| 10,273,867 | B2* | 4/2019 | Duan | F01P 5/14 |
| 10,488,090 | B2* | 11/2019 | Pham | F25B 40/02 |
| 2008/0077260 | A1* | 3/2008 | Porter | F25B 49/005 62/129 |
| 2014/0321499 | A1* | 10/2014 | Nakano | G01K 15/007 374/1 |
| 2016/0169572 | A1* | 6/2016 | Noboa | F25B 13/00 62/115 |
| 2018/0216517 | A1* | 8/2018 | Duan | F01P 5/12 |

* cited by examiner

*Primary Examiner* — Jon T. Schermerhorn, Jr.

(57) ABSTRACT

A method of identifying air flow faults within a cooling system of an automobile comprises measuring the temperature of coolant entering a heat exchanger for the cooling system, measuring the temperature of coolant leaving the heat exchanger, and measuring the temperature of ambient air that is flowing into the heat exchanger, calculating Actual Delta T by subtracting the temperature of coolant leaving the heat exchanger from the temperature of coolant entering the heat exchanger, calculating Expected Delta T, wherein Expected Delta T is a pre-determined value of an expected difference between the temperature of the coolant entering the heat exchanger and the temperature of the coolant leaving the heat exchanger, calculating Effective Delta T by subtracting Expected Delta T from Actual Delta T, and identifying a fault in the air flow through the heat exchanger based on the value of Effective Delta T.

20 Claims, 2 Drawing Sheets

COOLING SYSTEM AIR FLOW DIAGNOSIS

INTRODUCTION

The present disclosure relates to a cooling system for an automobile and a method of diagnosing air flow related faults in the cooling system.

For a cooling system to function properly it needs several things: proper coolant mixture and level, sufficient pressure, adequate coolant flow and sufficient airflow. Often, the primary way a driver of an automobile becomes aware of a problem with the cooling system is when the automobile overheats. By the time the temperature gauge in an automobile indicates the engine is running hot, it may be too late for the driver of the automobile to safely get the automobile to a location where the cooling system can be serviced before the engine overheats and the automobile is disabled.

Air flow through the heat exchanger or radiator of the cooling system of an automobile is a critical component to proper function of the cooling system. Thus, while automobiles are generally equipped with temperature gauges that allow the driver of an automobile to be aware of the temperature of the engine, there is a need for a new and improved coolant system for an automobile and method of detecting issues with the flow of air through the heat exchanger of the cooling system.

SUMMARY

According to several aspects of the present disclosure, a method of identifying air flow faults within a cooling system of an automobile comprises measuring the temperature of coolant entering a heat exchanger for the cooling system, measuring the temperature of coolant leaving the heat exchanger, and measuring the temperature of ambient air that is flowing into the heat exchanger. Calculating Actual Delta T by subtracting the temperature of coolant leaving the heat exchanger from the temperature of coolant entering the heat exchanger, calculating Expected Delta T, wherein Expected Delta T is a pre-determined value of an expected difference between the temperature of the coolant entering the heat exchanger and the temperature of the coolant leaving the heat exchanger, calculating Effective Delta T by subtracting Expected Delta T from Actual Delta T, and identifying a fault in the air flow through the heat exchanger based on the value of Effective Delta T.

According to another aspect of the present disclosure, identifying a fault in the air flow through the heat exchanger based on the value of Effective Delta T includes identifying a condition where air flow through the heat exchanger is above normal based on the value of Effective Delta T being positive.

According to another aspect of the present disclosure, identifying a fault in the air flow through the heat exchanger based on the value of Effective Delta T includes identifying a condition where air flow through the heat exchanger is below normal based on the value of Effective Delta T being negative.

According to another aspect of the present disclosure, the steps of measuring the temperature of coolant entering a heat exchanger for the cooling system, measuring the temperature of coolant leaving the heat exchanger, measuring the temperature of ambient air that is flowing through the heat exchanger, calculating Actual Delta T, calculating Expected Delta T, calculating Effective Delta T, and identifying a fault in the air flow through the heat exchanger based on the value of Effective Delta T are repeated on a pre-determined time interval to provide continuous monitoring of air flow through the heat exchanger.

According to another aspect of the present disclosure, the method further includes comparing sequential calculations of Effective Delta T to identify patterns in the variability of Effective Delta T.

According to another aspect of the present disclosure, identifying a fault in the air flow through the heat exchanger based on the value of Effective Delta T includes identifying a condition where air flow through the heat exchanger is increasing based on the value of sequential calculations of Effective Delta T increasing positively.

According to another aspect of the present disclosure, identifying a fault in the air flow through the heat exchanger based on the value of Effective Delta T includes identifying a condition where air flow through the heat exchanger is decreasing based on the value of sequential calculations of Effective Delta T increasing negatively.

According to another aspect of the present disclosure, calculating Expected Delta T further includes measuring a plurality of operating conditions and determining a value of Expected Delta T from a look-up table based on the measured operating conditions.

According to another aspect of the present disclosure, calculating Expected Delta T further includes measuring a plurality of operating conditions and mathematically calculating a value of Expected Delta T based on the measured plurality of operating conditions.

According to another aspect of the present disclosure, the method further includes keeping the automobile stationary and running an engine of the automobile for a pre-determined amount of time prior to the steps of measuring the temperature of coolant entering a heat exchanger, measuring the temperature of coolant leaving the heat exchanger, measuring the temperature of ambient air that is flowing through the heat exchanger, calculating Actual Delta T, calculating Expected Delta T, calculating Effective Delta T by subtracting Expected Delta T from Actual Delta T, and identifying a fault in the air flow through the heat exchanger based on the value of Effective Delta T.

According to another aspect of the present disclosure, the steps of keeping the automobile stationary and running an engine of the automobile for a pre-determined amount of time, measuring the temperature of coolant entering a heat exchanger, measuring the temperature of coolant leaving the heat exchanger, measuring the temperature of ambient air that is flowing through the heat exchanger, calculating Actual Delta T, calculating Expected Delta T, calculating Effective Delta T by subtracting Expected Delta T from Actual Delta T, and identifying a fault in the air flow through the heat exchanger based on the value of Effective Delta T are performed immediately after starting the automobile and before the automobile has moved.

According to another aspect of the present disclosure, the steps of keeping the automobile stationary and running an engine of the automobile for a pre-determined amount of time, measuring the temperature of coolant entering a heat exchanger, measuring the temperature of coolant leaving the heat exchanger, measuring the temperature of ambient air that is flowing through the heat exchanger, calculating Actual Delta T, calculating Expected Delta T, calculating Effective Delta T by subtracting Expected Delta T from Actual Delta T, and identifying a fault in the air flow through the heat exchanger based on the value of Effective Delta T are performed after usage of the automobile and prior to turning the engine off.

According to another aspect of the present disclosure, the method further includes removing selectable air flow obstructions that may impede the flow of air into and through the heat exchanger prior to the steps of keeping the automobile stationary and running an engine of the automobile for a pre-determined amount of time, measuring the temperature of coolant entering a heat exchanger, measuring the temperature of coolant leaving the heat exchanger, measuring the temperature of ambient air that is flowing through the heat exchanger, calculating Actual Delta T, calculating Expected Delta T, calculating Effective Delta T by subtracting Expected Delta T from Actual Delta T, and identifying a fault in the air flow through the heat exchanger based on the value of Effective Delta T are performed after usage of the automobile and prior to turning the engine off.

According to several aspects of the present disclosure, a coolant system for an automobile comprises a heat exchanger adapted to lower the temperature of coolant circulated therethrough, an incoming temperature sensor adapted to measure the temperature of coolant entering the heat exchanger, an outgoing temperature sensor adapted to measure the temperature of coolant leaving the heat exchanger, an air temperature sensor adapted to measure the temperature of ambient air that is flowing into the heat exchanger, a computer adapted to receive information from the incoming temperature sensor, the outgoing temperature sensor and the air temperature sensor, the computer further adapted to calculate an Actual Delta T by subtracting the temperature of coolant leaving the heat exchanger from the temperature of coolant entering the heat exchanger, calculate an Expected Delta T, wherein Expected Delta T is a pre-determined value of an expected difference between the temperature of the coolant entering the heat exchanger and the temperature of the coolant leaving the heat exchanger, calculate an Effective Delta T by subtracting Expected Delta T from Actual Delta T, and identify a fault in the air flow through the heat exchanger based on the value of Effective Delta T.

According to another aspect of the present disclosure, the computer identifies a condition where air flow through the heat exchanger is above normal when the value of Effective Delta T is positive, and the computer identifies a condition where airflow through the heat exchanger is below normal when the value of Effective Delta T is negative.

According to another aspect of the present disclosure, the computer is further adapted to repeatedly receive information from the incoming temperature sensor, the outgoing temperature sensor and the air temperature sensor, calculate an Actual Delta T, calculate an Expected Delta T, calculate an Effective Delta T, and identify a fault in the air flow through the heat exchanger based on the value of Effective Delta T on a pre-determined time interval to provide continuous monitoring of airflow through the heat exchanger.

According to another aspect of the present disclosure, the computer is adapted to compare sequential calculations of Effective Delta T, the computer further adapted to identify a condition where air flow through the heat exchanger is increasing when the value of sequential calculations of Effective Delta T increase positively, and to identify a condition where air flow through the heat exchanger is decreasing when the value of sequential calculations of Effective Delta T increase negatively.

According to another aspect of the preset disclosure, the computer is further adapted to receive information from sensors within the automobile that monitor a plurality of operating conditions, further wherein the computer calculates Expected Delta T by one of, determining a value of Expected Delta T from a look-up table based on the measured operating conditions, and mathematically calculating a value of Expected Delta T based on the measured plurality of operating conditions.

According to another aspect of the present disclosure, the computer is adapted to continuously monitor the air flow through the heat exchanger from the time an engine within the automobile is started, during operation of the automobile, and after operation of the automobile until the engine is shut off.

According to several aspects of the present disclosure, a method of identifying air flow faults within a cooling system of an automobile comprises measuring the temperature of coolant entering a heat exchanger for the cooling system, measuring the temperature of coolant leaving the heat exchanger, and measuring the temperature of ambient air that is flowing into the heat exchanger, calculating Actual Delta T by subtracting the temperature of coolant leaving the heat exchanger from the temperature of coolant entering the heat exchanger, measuring a plurality of operating conditions, calculating Expected Delta T by one of, determining a value of Expected Delta T from a look-up table based on the measured operating conditions, and mathematically calculating a value of Expected Delta T based on the measured plurality of operating conditions, calculating Effective Delta T by subtracting Expected Delta T from Actual Delta T, repeating the steps of measuring the temperature of coolant entering a heat exchanger for the cooling system, measuring the temperature of coolant leaving the heat exchanger, measuring the temperature of ambient air that is flowing into the heat exchanger, calculating Actual Delta T, calculating Expected Delta T, and calculating Effective Delta T on a pre-determined time interval, identifying a condition where air flow through the heat exchanger is above normal based on the value of Effective Delta T being positive, identifying a condition where air flow through the heat exchanger is below normal based on the value of Effective Delta T being negative, comparing sequential calculations of Effective Delta T, identifying a condition where air flow through the heat exchanger is increasing based on the value of sequential calculations of Effective Delta T increasing positively, identifying a condition where air flow through the heat exchanger is decreasing based on the value of sequential calculations of Effective Delta T increasing negatively, and identifying a fault in the air flow through the heat exchanger based on the value of Effective Delta T.

Further areas of applicability will become apparent from the description provided herein. It should be understood that the description and specific examples are intended for purposes of illustration only and are not intended to limit the scope of the present disclosure.

BRIEF DESCRIPTION OF THE DRAWINGS

The drawings described herein are for illustration purposes only and are not intended to limit the scope of the present disclosure in any way.

DETAILED DESCRIPTION

The following description is merely exemplary in nature and is not intended to limit the present disclosure, application, or uses.

Figure 1:
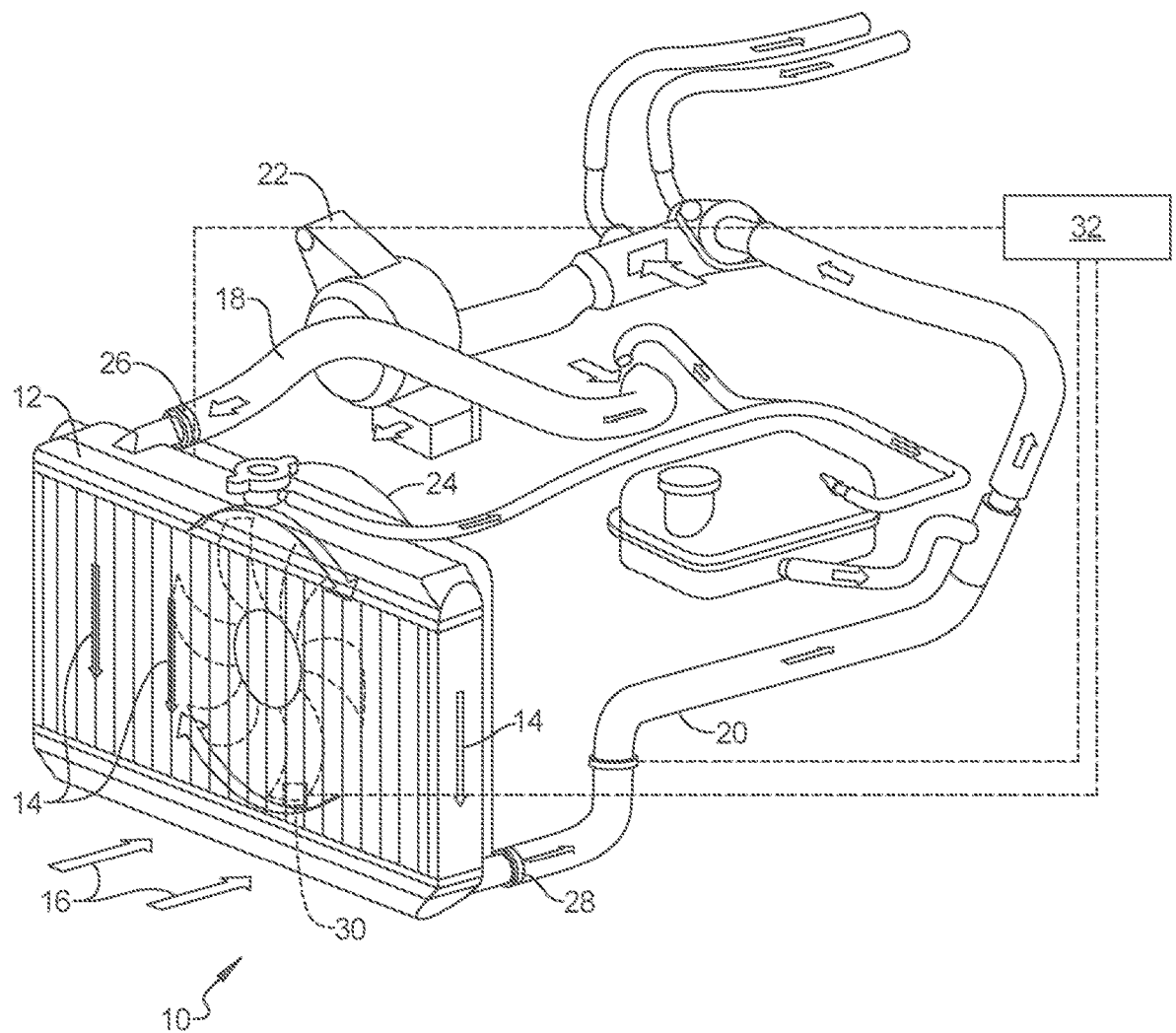
FIG. 1 is a perspective view of a cooling system according to an exemplary embodiment.

Referring to FIG. 1, a cooling system 10 for an automobile is generally shown. The cooling system 10 includes a heat exchanger 12 that is adapted to lower the temperature of coolant that is circulated through the heat exchanger 12. The coolant is cooled by the transfer of heat from the coolant flowing internally through the heat exchanger 12, as indicated at 14, to air flowing externally through the heat exchanger 12, as indicated at 16. Coolant circulates through and is heated by an engine (not shown) of the automobile. The heated coolant flows from the engine into the heat exchanger 12 through an inlet hose 18. The coolant flows internally through the heat exchanger 12 and is cooled by the flow of ambient air externally through the heat exchanger 12. The cooled coolant leaves the heat exchanger 12 through an outlet hose 20 and flows back to the engine to provide cooling of the engine. A pump 22 circulates the coolant through the engine and heat exchanger 12. Generally, a fan 24 is mounted onto the heat exchanger 12 to increase the flow of ambient air through the heat exchanger 12.

The cooling system further includes an incoming temperature sensor 26, an outgoing temperature sensor 28, and an air temperature sensor 30. The incoming temperature sensor 26 is positioned between the engine and the heat exchanger 12 and is adapted to measure the temperature of the coolant flowing from the engine and into the heat exchanger 12 through the inlet hose 18. In an exemplary embodiment, the incoming temperature sensor measures the temperature of the coolant within the inlet hose 18 immediately prior to the coolant entering the heat exchanger 12.

The outgoing temperature sensor 28 is positioned between the engine and the heat exchanger 12 and is adapted to measure the temperature of the coolant flowing from the heat exchanger 12 to the engine through the outlet hose 20. In an exemplary embodiment, the outgoing temperature sensor 28 measures the temperature of the coolant within the outlet hose 20 immediately after the coolant leaves the heat exchanger 12. The air temperature sensor 30 is positioned in front of the heat exchanger 12 and is adapted to measure the temperature of ambient air that is flowing into the heat exchanger.

A computer 32 is adapted to receive information from the incoming temperature sensor 26, the outgoing temperature sensor 28 and the air temperature sensor 30. Computer 32 is a non-generalized, electronic device having a preprogrammed digital computer processor, memory or non-transitory computer readable medium used to store data such as control logic, software applications, instructions, computer code, data, lookup tables, etc., and a transceiver or input/output ports. Computer readable medium includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device. Computer code includes any type of program code, including source code, object code, and executable code.

The computer is further adapted to calculate an Actual Delta T by subtracting the temperature of coolant leaving the heat exchanger 12 from the temperature of coolant entering the heat exchanger 12. The computer also calculates an Expected Delta T, wherein Expected Delta T is a predetermined value of an expected difference between the temperature of the coolant entering the heat exchanger 12 and the temperature of the coolant leaving the heat exchanger 12.

Expected Delta T can be calculated by the computer 32 by taking measurements of a plurality of operating conditions of the automobile and determining a value of Expected Delta T from a look-up table based on the measured operating conditions. Operating conditions of the automobile that are used in calculating Expected Delta T include, but are not limited to, speed of the automobile, cooling fan speed, coolant pump speed, whether the automobile is loaded or towing a trailer, engine speed of the automobile, and usage of heater/air conditioner within the automobile. If the automobile has an electric coolant pump, then the coolant pump speed is the speed of the electric coolant pump motor. If the automobile has a mechanical coolant pump that is driven by the engine of the automobile at a constant ratio, then the coolant pump speed is the engine speed. The look-up table includes data stored therein to match the operating conditions of the vehicle to a value of Expected Delta T based on experimentation and formulations done in advance. Alternatively, Expected Delta T is calculated by the computer 32, wherein the computer 32 uses the values of measured operating conditions of the automobile to calculate, in real time, a value of Expected Delta T.

The computer 32 is further adapted to calculate an Effective Delta T by subtracting Expected Delta T from Actual Delta T. The computer 32 is adapted to use the calculated values of Actual Delta T, Expected Delta T, and Effective Delta T to identify a fault in the air flow through the heat exchanger 12 based on the value of Effective Delta T.

Figure 2:
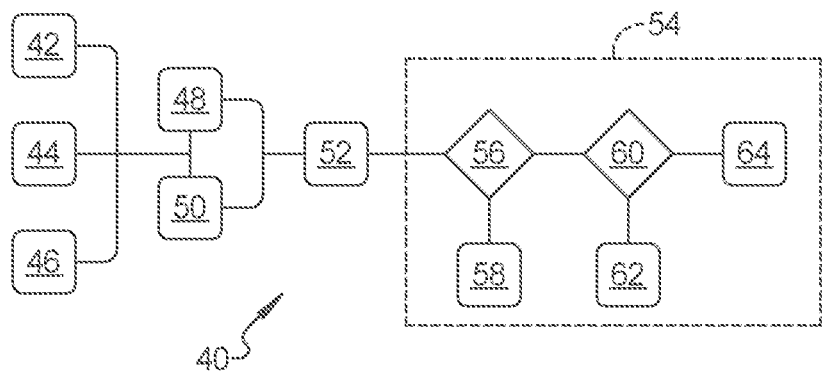
FIG. 2 is a schematic flow chart illustrating a method of identifying air flow faults within a cooling system according to an exemplary embodiment.

Referring to FIG. 2, a method 40 of identifying air flow faults within the cooling system 10 of an automobile includes measuring 42 the temperature of coolant entering the heat exchanger 12 for the cooling system 10, measuring 44 the temperature of coolant leaving the heat exchanger 12, and measuring 46 the temperature of ambient air that is flowing into the heat exchanger 12. The computer then calculates an Actual Delta T and an Expected Delta T.

The computer 32 calculates 48 an actual Delta T, calculates 50 an Expected Delta T and calculates 52 an Effective Delta T. Actual Delta T is calculated by subtracting the temperature of coolant leaving the heat exchanger 12 from the temperature of coolant entering the heat exchanger 12. Expected Delta T is calculated 50 by the computer either by taking measurements of operating conditions of the automobile and using these measurements to determine a value of Expected Delta T from a look-up table, or by using the measured operating conditions to calculate, in real time, an Expected Delta T.

The computer 32 calculates 52 Effective Delta T by subtracting Expected Delta T from Actual Delta T, and uses the value of Effective Delta T to identify 54 a fault in the air flow through the heat exchanger 12.

The computer 32 identifies 54 faults in the air flow by evaluating the value of Effective Delta T. If the computer 32 determines 56 that the value of Effective Delta T is positive, then the computer identifies 58 a fault condition indicating that the air flow is higher than normal. If the computer 32 determines 60 that the value of Effective Delta T is negative, then the computer 32 identifies 62 a fault condition indicating that the air flow is lower than normal. If the computer determines that Effective Delta T is zero, then the computer identifies 64 a no-fault condition.

Identification of faults in the air flow that indicate the airflow is either higher than normal or lower than normal can be used to predict or diagnose the problem causing the fault. For example, a fault indicating that the air flow through the heat exchanger 12 is lower than normal may be an indication that there is a blockage of the air flowing into and through the heat exchanger 12, or that the heat exchanger 12 is damaged and not providing efficient heat exchange between the coolant and the air. Identification of this type of air flow fault in combination with data from other sensors and diagnostic systems within the automobile will help identify with more specificity, what is causing the air flow fault. Further, the identification of subtle air flow faults in the cooling system 10, before there is an actual over-heating issue, can alert the driver of the automobile of a potential issue before the problem disables the automobile.

Figure 3:
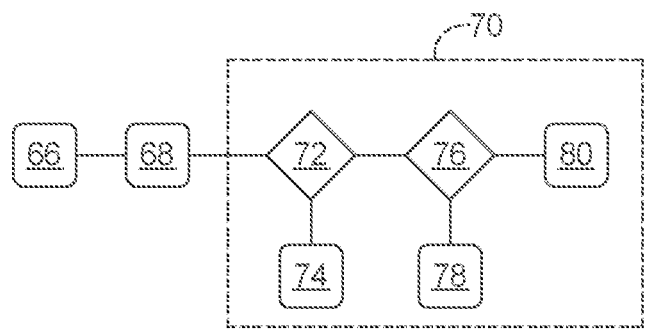
FIG. 3 is a schematic flow chart illustrating a method of identifying air flow faults within a cooling system according to another exemplary embodiment.

Referring to FIG. 3, in an exemplary embodiment, the steps of measuring 42 the temperature of coolant entering a heat exchanger 12 for the cooling system 10, measuring 44 the temperature of coolant leaving the heat exchanger 12, measuring 46 the temperature of ambient air that is flowing through the heat exchanger 12, calculating 48 Actual Delta T, calculating 50 Expected Delta T, calculating 52 Effective Delta T, and identifying 54 a fault in the airflow through the heat exchanger 12 based on the value of Effective Delta T are repeated on a pre-determined time interval to provide continuous monitoring of air flow through the heat exchanger 12.

The computer 32 compares 68 sequential calculations of Effective Delta T to identify 70 patterns in the variability of Effective Delta T. If the computer 32 identifies 72 a pattern wherein sequential calculations of Effective Delta T are increasing positively, then the computer identifies 74 a fault condition indicating that the air flow is not steady-state, and is increasing. If the computer 32 identifies 76 a pattern wherein sequential calculations of Effective Delta T are decreasing negatively, the computer identifies 78 a fault condition indicating that the air flow is not steady-state, and is decreasing. If the computer 32 identifies a pattern wherein sequential calculations of Effective Delta T are not increasing or decreasing, then the computer 32 identifies 80 a no-fault condition.

Identification of air flow faults where the flow of air through the heat exchanger 12 is increasing positively, or decreasing negatively, will identify issues where the performance of the cooling system is in flux. For example, an air flow fault indicating that the air flow is less than normal and decreasing at a gradual rate, may indicate that that efficiency of the air flow through the heat exchanger 12 is degrading. Additionally, an air flow fault indicating that the air flow is less than normal and rapidly decreasing, may be an indication that there has been a catastrophic event, and that immediate attention to the cooling system 10 is necessary.

In some circumstances, it may be advantageous to perform the air flow fault detection method 26 described above when a automobile is not moving. This provides an opportunity to evaluate the air flow through the heat exchanger 12 under controllable circumstances, eliminating interference from temperature gradients, wind gusts, and rough road conditions that an automobile experiences while in motion, and which may effect the accuracy and reliability of the air flow evaluation.

Figure 4:
FIG. 4 is a schematic flow chart illustrating a method of performing an intrusive test to identify air flow faults within a cooling system prior to operation of an automobile according to an exemplary embodiment.

Referring to FIG. 4, an intrusive air flow evaluation is performed on an automobile prior to usage of the automobile, by starting 82 the engine of the automobile, keeping the automobile stationary and running 84 the engine of the automobile for a pre-determined amount of time prior to the steps of measuring 42 the temperature of coolant entering a heat exchanger 12, measuring 44 the temperature of coolant leaving the heat exchanger 12, measuring 46 the temperature of ambient air that is flowing through the heat exchanger 12, calculating 48 Actual Delta T, calculating 50 Expected Delta T, calculating 52 Effective Delta T by subtracting Expected Delta T from Actual Delta T, and identifying 54 a fault in the air flow through the heat exchanger 12 based on the value of Effective Delta T. After the computer has identified any air flow faults, the test is complete, and the automobile is ready to be driven 86.

Prior to running 84 the engine of the automobile for a pre-determined amount of time, selectable air flow obstructions are removed 87 from the path of air flowing into and through the heat exchanger 12. Items like snow plows, or air dams that impede the flow of air into and through the heat exchanger 12 can affect the accuracy of the temperature measurements 42, 44, 46 and the identification 54 of air flow faults.

Figure 5:
FIG. 5 is a schematic flow chart illustrating a method of performing an intrusive test to identify air flow faults within a cooling system after operation of an automobile according to an exemplary embodiment.

Referring to FIG. 5, an intrusive air flow evaluation is performed on an automobile after usage of the automobile and prior to shutting off the engine of the automobile, bringing 88 the automobile to a complete stop, by keeping the automobile stationary and running 90 the engine of the automobile for a pre-determined amount of time prior to the steps of measuring 42 the temperature of coolant entering a heat exchanger 12, measuring 44 the temperature of coolant leaving the heat exchanger 12, measuring 46 the temperature of ambient air that is flowing through the heat exchanger 12, calculating 48 Actual Delta T, calculating 50 Expected Delta T, calculating 52 Effective Delta T by subtracting Expected Delta T from Actual Delta T, and identifying 54 a fault in the air flow through the heat exchanger 12 based on the value of Effective Delta T. After the computer 32 has identified any air flow faults, the test is complete, and the engine of the automobile is shut off 92.

After bringing 88 the automobile to a stop, and prior to running 90 the engine of the automobile for a pre-determined amount of time, selectable air flow obstructions are removed 93 from the path of air flowing into and through the heat exchanger 12. Items like snow plows, or air dams that impede the flow of air into and through the heat exchanger 12 can affect the accuracy of the temperature measurements 42, 44, 46 and the identification 54 of air flow faults.

A cooling system 10 and method 40 of identifying air flow faults of the present disclosure offers several advantages. These include the ability to continuously monitor the efficiency of the air flow through the heat exchanger 12 and identify subtle faults that may indicate damage to the cooling system before there is an over-heating situation, as well as catastrophic damage to the cooling system that requires immediate attention. The cooling system 10 and method 40 of the present disclosure identifies air flow faults using some of the sensors and monitoring systems that are already used in automobiles.

The description of the present disclosure is merely exemplary in nature and variations that do not depart from the gist of the present disclosure are intended to be within the scope of the present disclosure. Such variations are not to be regarded as a departure from the spirit and scope of the present disclosure.

What is claimed is:

1. A method of identifying air flow faults within a cooling system of an automobile comprising:
measuring the temperature of coolant entering a heat exchanger for the cooling system, measuring the temperature of coolant leaving the heat exchanger, and measuring the temperature of ambient air that is flowing into the heat exchanger;
calculating an Actual Delta T by subtracting the temperature of coolant leaving the heat exchanger from the temperature of coolant entering the heat exchanger;
calculating an Expected Delta T, wherein Expected Delta T is a pre-determined value of an expected difference between the temperature of the coolant entering the heat exchanger and the temperature of the coolant leaving the heat exchanger;
calculating an Effective Delta T by subtracting Expected Delta T from Actual Delta T; and
identifying a fault in the air flow through the heat exchanger based on the value of Effective Delta T.

2. The method of claim 1, wherein identifying a fault in the air flow through the heat exchanger based on the value of Effective Delta T includes identifying a condition where air flow through the heat exchanger is above normal based on the value of Effective Delta T being positive.

3. The method of claim 1, wherein identifying a fault in the air flow through the heat exchanger based on the value of Effective Delta T includes identifying a condition where air flow through the heat exchanger is below normal based on the value of Effective Delta T being negative.

4. The method of claim 1, wherein the steps of measuring the temperature of coolant entering a heat exchanger for the cooling system, measuring the temperature of coolant leaving the heat exchanger, measuring the temperature of ambient air that is flowing through the heat exchanger, calculating Actual Delta T, calculating Expected Delta T, calculating Effective Delta T, and identifying a fault in the air flow through the heat exchanger based on the value of Effective Delta T are repeated on a pre-determined time interval to provide continuous monitoring of air flow through the heat exchanger.

5. The method of claim 4, further including comparing sequential calculations of Effective Delta T to identify patterns in the variability of Effective Delta T.

6. The method of claim 5, wherein identifying a fault in the air flow through the heat exchanger based on the value of Effective Delta T includes identifying a condition where air flow through the heat exchanger is increasing based on the value of sequential calculations of Effective Delta T increasing positively.

7. The method of claim 5, wherein identifying a fault in the air flow through the heat exchanger based on the value of Effective Delta T includes identifying a condition where air flow through the heat exchanger is decreasing based on the value of sequential calculations of Effective Delta T increasing negatively.

8. The method of claim 1, wherein calculating Expected Delta T further includes measuring a plurality of operating conditions and determining a value of Expected Delta T from a look-up table based on the measured operating conditions, wherein the measured operating conditions include vehicle speed, fan speed, and coolant pump speed.

9. The method of claim 1, wherein calculating Expected Delta T further includes measuring a plurality of operating conditions and mathematically calculating a value of Expected Delta T based on the measured plurality of operating conditions.

10. The method of claim 1, further includes keeping the automobile stationary and running an engine of the automobile for a pre-determined amount of time prior to the steps of measuring the temperature of coolant entering a heat exchanger, measuring the temperature of coolant leaving the heat exchanger, measuring the temperature of ambient air that is flowing through the heat exchanger, calculating Actual Delta T, calculating Expected Delta T, calculating Effective Delta T by subtracting Expected Delta T from Actual Delta T, and identifying a fault in the air flow through the heat exchanger based on the value of Effective Delta T.

11. The method of claim 10, wherein the steps of keeping the automobile stationary and running an engine of the automobile for a pre-determined amount of time, measuring the temperature of coolant entering a heat exchanger, measuring the temperature of coolant leaving the heat exchanger, measuring the temperature of ambient air that is flowing through the heat exchanger, calculating Actual Delta T, calculating Expected Delta T, calculating Effective Delta T by subtracting Expected Delta T from Actual Delta T, and identifying a fault in the air flow through the heat exchanger based on the value of Effective Delta T are performed immediately after starting the automobile and before the automobile has moved.

12. The method of claim 10, wherein the steps of keeping the automobile stationary and running an engine of the automobile for a pre-determined amount of time, measuring the temperature of coolant entering a heat exchanger, measuring the temperature of coolant leaving the heat exchanger, measuring the temperature of ambient air that is flowing through the heat exchanger, calculating Actual Delta T, calculating Expected Delta T, calculating Effective Delta T by subtracting Expected Delta T from Actual Delta T, and identifying a fault in the air flow through the heat exchanger based on the value of Effective Delta T are performed after usage of the automobile and prior to turning the engine off.

13. The method of claim 9, further including removing selectable air flow obstructions that may impede the flow of air into and through the heat exchanger prior to the steps of keeping the automobile stationary and running an engine of the automobile for a pre-determined amount of time, measuring the temperature of coolant entering a heat exchanger, measuring the temperature of coolant leaving the heat exchanger, measuring the temperature of ambient air that is flowing through the heat exchanger, calculating Actual Delta T, calculating Expected Delta T, calculating Effective Delta T by subtracting Expected Delta T from Actual Delta T, and identifying a fault in the air flow through the heat exchanger based on the value of Effective Delta T are performed after usage of the automobile and prior to turning the engine off.

14. A coolant system for an automobile comprising:
a heat exchanger adapted to lower the temperature of coolant circulated therethrough;
an incoming temperature sensor adapted to measure the temperature of coolant entering the heat exchanger;
an outgoing temperature sensor adapted to measure the temperature of coolant leaving the heat exchanger;
an air temperature sensor adapted to measure the temperature of ambient air that is flowing into the heat exchanger;
a computer adapted to receive information from the incoming temperature sensor, the outgoing temperature sensor and the air temperature sensor, the computer further adapted to calculate an Actual Delta T by subtracting the temperature of coolant leaving the heat exchanger from the temperature of coolant entering the heat exchanger, calculate an Expected Delta T, wherein Expected Delta T is a pre-determined value of an expected difference between the temperature of the coolant entering the heat exchanger and the temperature of the coolant leaving the heat exchanger, calculate an Effective Delta T by subtracting Expected Delta T from Actual Delta T, and identify a fault in the air flow through the heat exchanger based on the value of Effective Delta T.

15. The system of claim 14, wherein the computer identifies a condition where air flow through the heat exchanger is above normal when the value of Effective Delta T is positive, and the computer identifies a condition where air flow through the heat exchanger is below normal when the value of Effective Delta T is negative.

16. The system of claim 15, wherein the computer is further adapted to repeatedly receive information from the incoming temperature sensor, the outgoing temperature sensor and the air temperature sensor, calculate an Actual Delta T, calculate an Expected Delta T, calculate an Effective Delta T, and identify a fault in the airflow through the heat exchanger based on the value of Effective Delta T on a pre-determined time interval to provide continuous monitoring of air flow through the heat exchanger.

17. The system of claim 16, wherein the computer is adapted to compare sequential calculations of Effective Delta T, the computer further adapted to identify a condition where air flow through the heat exchanger is increasing when the value of sequential calculations of Effective Delta T increase positively, and to identify a condition where air flow through the heat exchanger is decreasing when the value of sequential calculations of Effective Delta T increase negatively.

18. The system of claim 17, wherein the computer is further adapted to receive information from sensors within the automobile that monitor a plurality of operating conditions, further wherein the computer calculates Expected Delta T by one of, determining a value of Expected Delta T from a look-up table based on the measured operating conditions, and mathematically calculating a value of Expected Delta T based on the measured plurality of operating conditions wherein the measured operating conditions include vehicle speed, fan speed, and coolant pump speed.

19. The system of claim 16, wherein the computer is adapted to continuously monitor the air flow through the heat exchanger from the time an engine within the automobile is started, during operation of the automobile, and after operation of the automobile until the engine is shut off.

20. A method of identifying air flow faults within a cooling system of an automobile comprising:
measuring the temperature of coolant entering a heat exchanger for the cooling system, measuring the temperature of coolant leaving the heat exchanger, and measuring the temperature of ambient air that is flowing into the heat exchanger;
calculating an Actual Delta T by subtracting the temperature of coolant leaving the heat exchanger from the temperature of coolant entering the heat exchanger;
measuring a plurality of operating conditions;
calculating an Expected Delta T by one of, determining a value of Expected Delta T from a look-up table based on the measured operating conditions, and mathematically calculating a value of Expected Delta T based on the measured plurality of operating conditions;
calculating an Effective Delta T by subtracting Expected Delta T from Actual Delta T;
repeating the steps of measuring the temperature of coolant entering a heat exchanger for the cooling system, measuring the temperature of coolant leaving the heat exchanger, measuring the temperature of ambient air that is flowing into the heat exchanger, calculating Actual Delta T, calculating Expected Delta T, and calculating Effective Delta T on a pre-determined time interval;
identifying a condition where air flow through the heat exchanger is above normal based on the value of Effective Delta T being positive;
identifying a condition where air flow through the heat exchanger is below normal based on the value of Effective Delta T being negative;
comparing sequential calculations of Effective Delta T;
identifying a condition where air flow through the heat exchanger is increasing based on the value of sequential calculations of Effective Delta T increasing positively;
identifying a condition where air flow through the heat exchanger is decreasing based on the value of sequential calculations of Effective Delta T increasing negatively;
identifying a fault in the air flow through the heat exchanger based on the value of Effective Delta T.

* * * * *